United States Patent [19]

Keller et al.

[11] 4,107,488

[45] Aug. 15, 1978

[54] PLATFORM MOUNTED SWITCH OPERATING MECHANISM

[75] Inventors: Frank R. Keller, Villanova, Pa.; Frank W. Kussy, Randallstown, Md.; Bernard DiMarco, Bellefontaine, Ohio; Michel M. Fenneteau, Gaithersburg, Md.

[73] Assignee: Gould Inc., Rolling Meadows, Ill.

[21] Appl. No.: 746,833

[22] Filed: Dec. 2, 1976

[51] Int. Cl.² ............................................... H01H 9/22
[52] U.S. Cl. ................................... 200/50 A; 200/333
[58] Field of Search ........ 200/50 A, 50 AA, 333–337; 361/339, 341

[56] References Cited

U.S. PATENT DOCUMENTS

| | | | |
|---|---|---|---|
| 3,213,224 | 10/1965 | Mrenna | 200/50 A |
| 3,229,056 | 1/1966 | Turnbull | 200/50 A |
| 3,296,393 | 1/1967 | Rimmer | 200/50 A |
| 3,801,765 | 4/1974 | Hodgson | 200/50 A |
| 3,896,353 | 7/1975 | Burton | 200/50 AA |
| 3,980,845 | 9/1976 | Gryctko | 200/50 A |

Primary Examiner—Robert K. Schaefer
Assistant Examiner—William L. Feeney
Attorney, Agent, or Firm—Ostrolenk, Faber, Gerb & Soffen

[57] ABSTRACT

An electric switch mounted within an enclosure having a hinged cover is manually operated from outside the enclosure by a handle mechanism secured to the enclosure. The cover is provided with a single aperture near the edge thereof remote from the cover hinges, with this aperture providing clearance for the operating handle of the mechanism when the cover is closed and also providing clearance for a catch which holds the cover closed. The mechanism also includes a defeatable cover interlock to prevent opening of the cover when the switch is closed, and a defeatable switch interlock to prevent closing of the switch when the cover is open.

10 Claims, 32 Drawing Figures

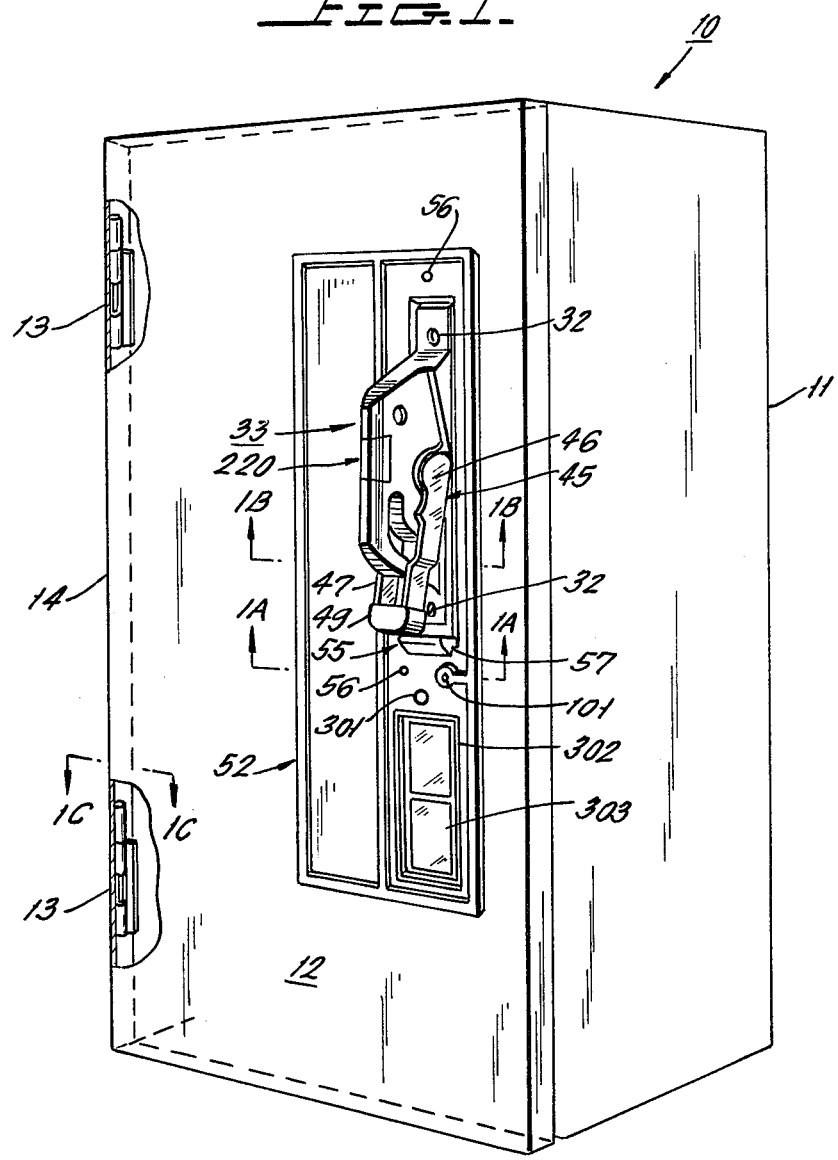
FIG. 1.
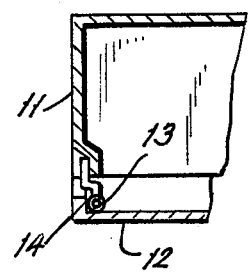
FIG. 1C.
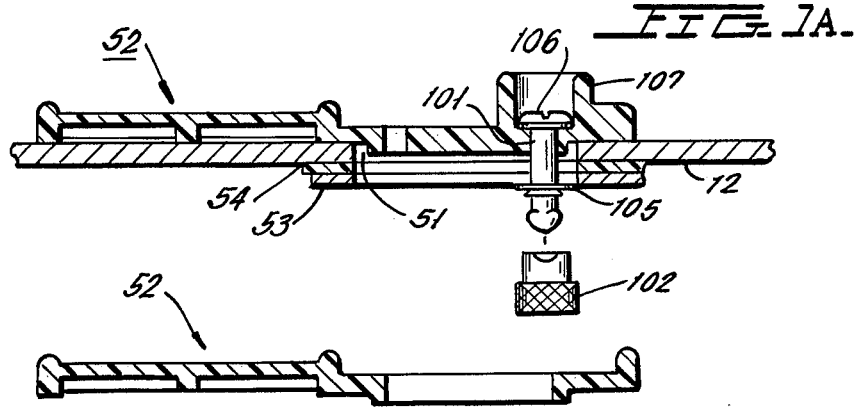
FIG. 1A.
FIG. 1B.

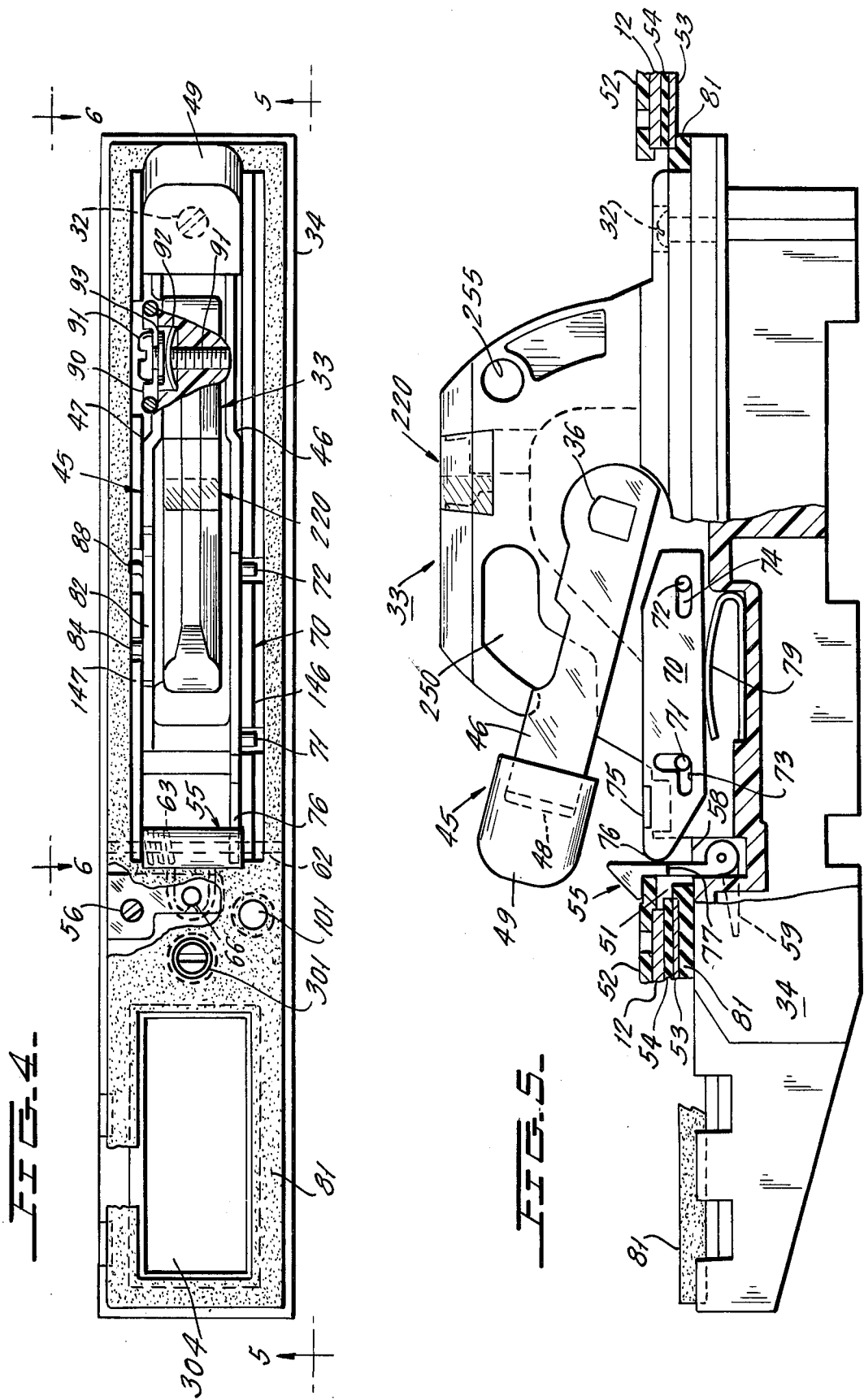

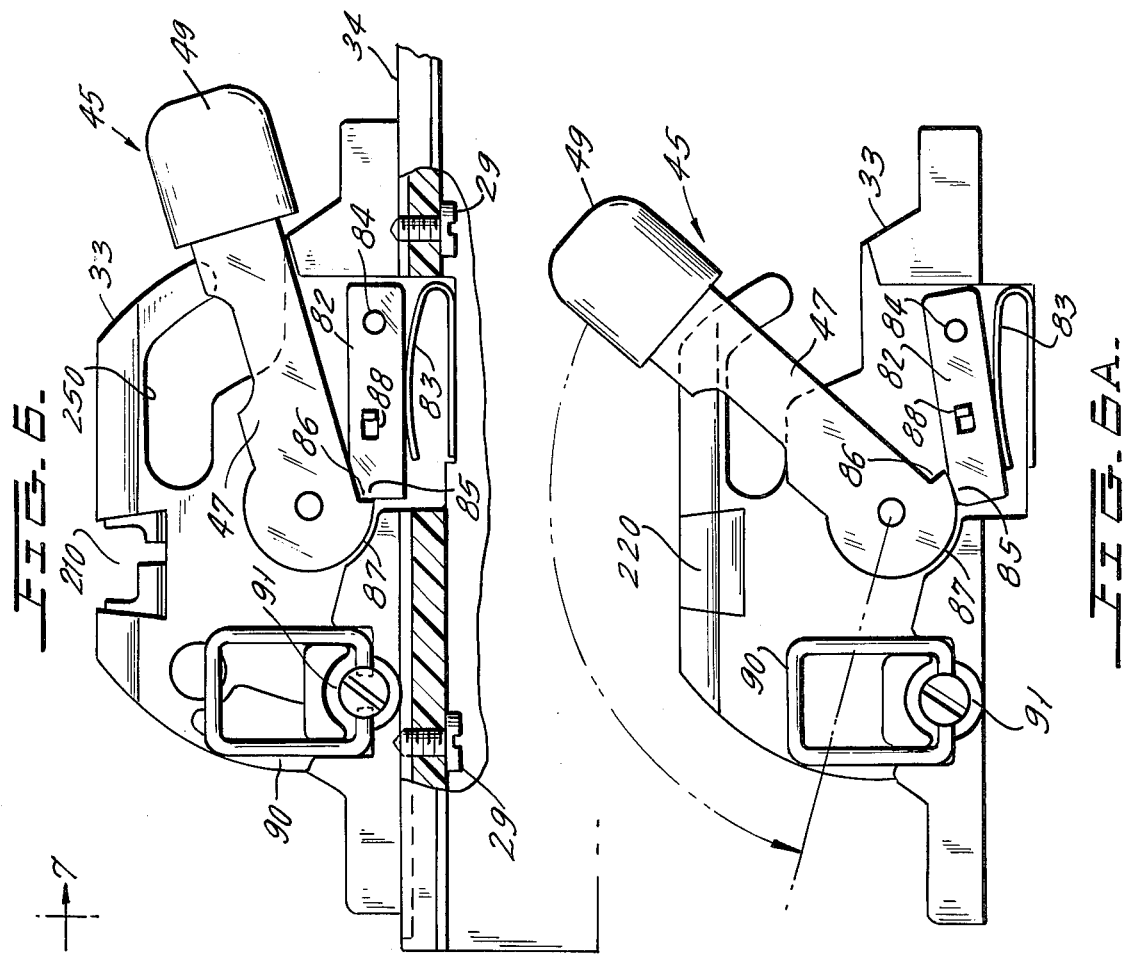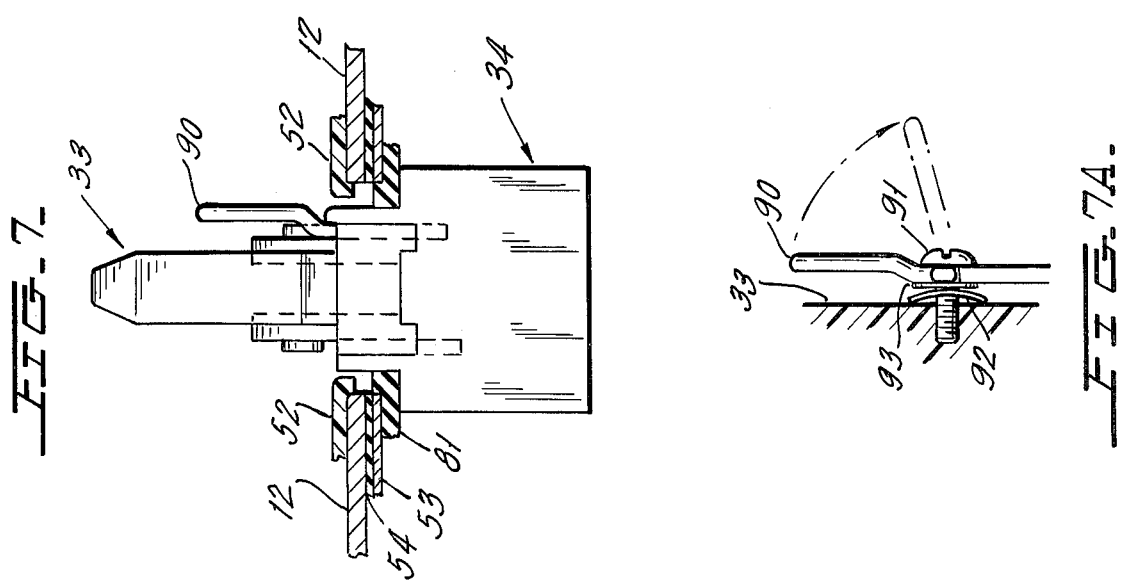

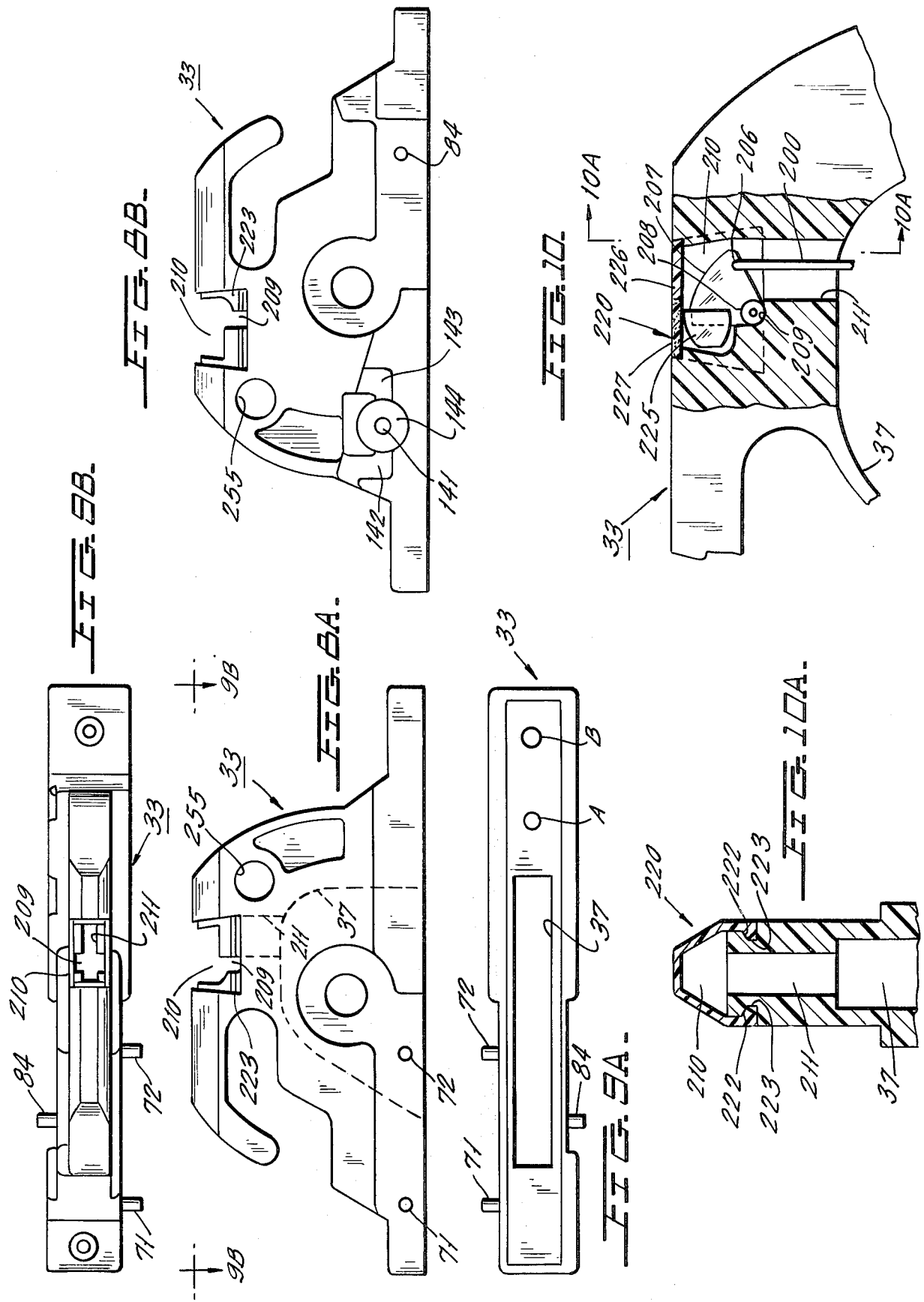

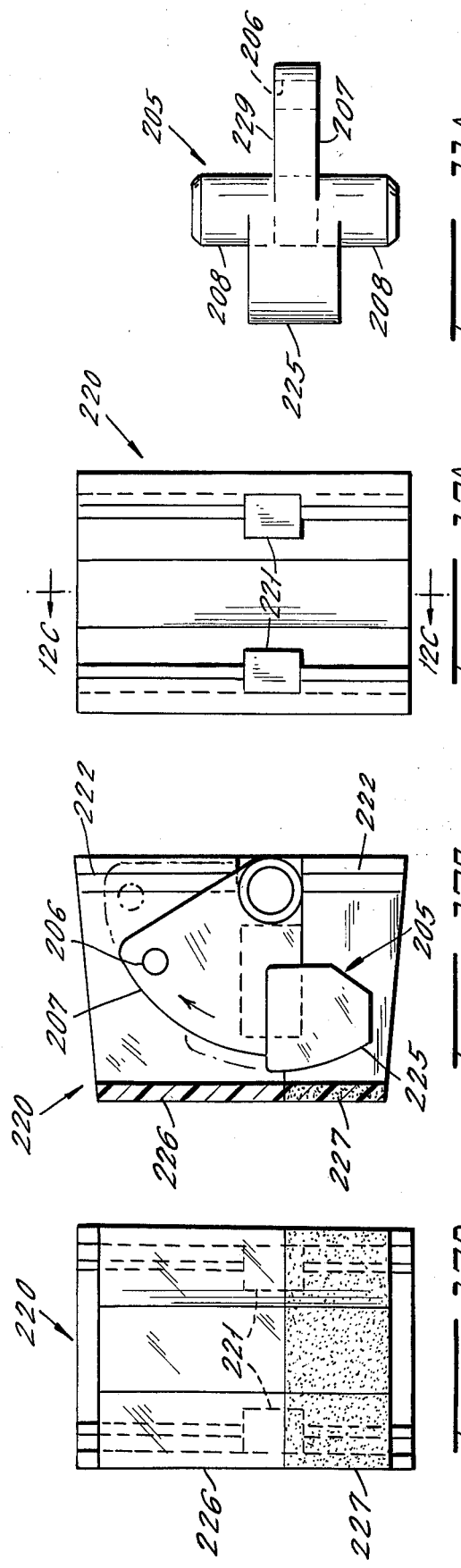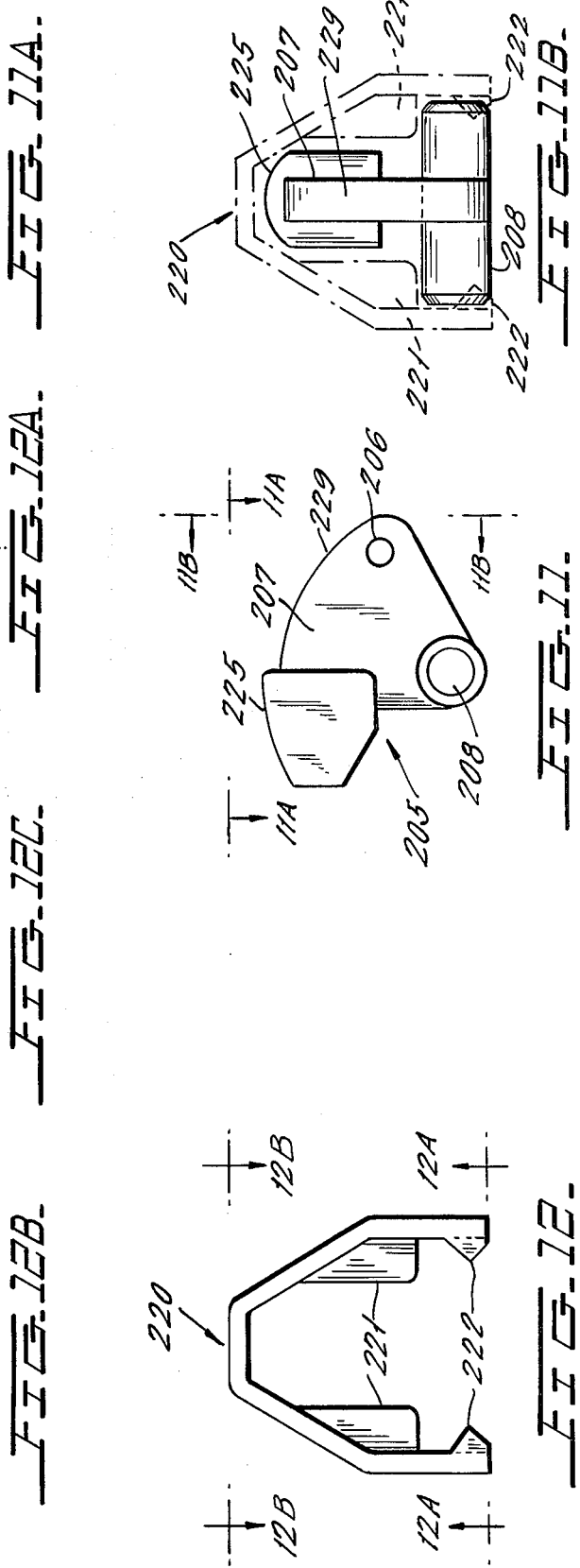

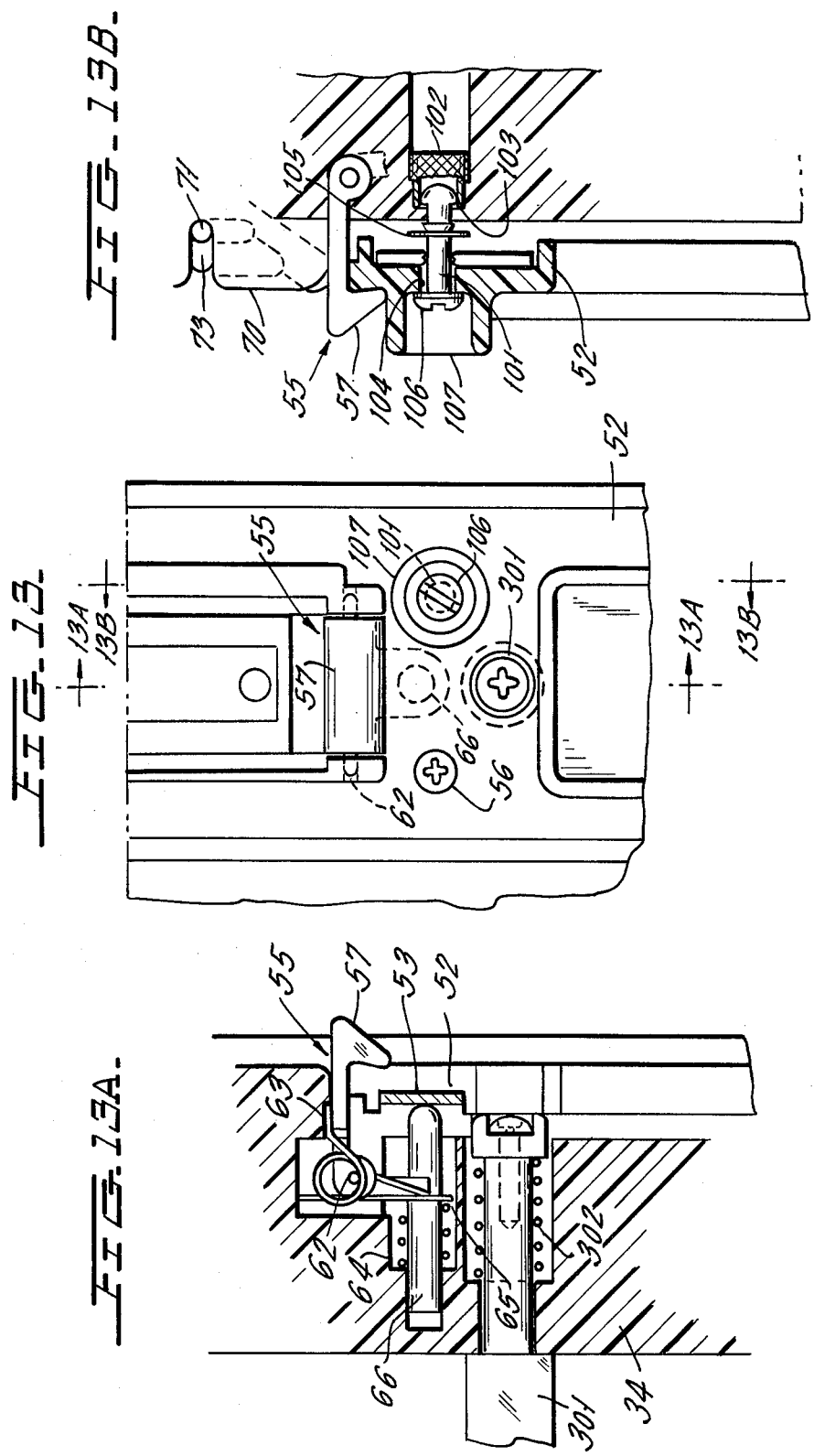

PLATFORM MOUNTED SWITCH OPERATING MECHANISM

This invention relates generally to manual operating mechanisms for enclosure mounted switches and more particularly relates to a mechanism of this type that is convenient to install.

Electric switches mounted within enclosures and operable manually by a handle accessible from outside of the enclosure at the front thereof are usually provided with so-called cover and switch interlocks. The cover interlock prevents opening of the cover when the switch is closed and the switch interlock prevents closing of the switch when the cover is open. In the prior art, when the handle was connected to the switch for all positions of the openable enclosure over it was necessary to provide an aperture in the enclosure or its cover for mounting or clearance of the handle operating mechanism, and it was also necessary to provide a separate aperture and/or additional member to cooperate with the cover catch to maintain the cover in closed position.

Pursuant to the instant invention a single aperture in the enclosure cover is all that is required to provide clearance for the handle operating mechanism mounted to the rear wall of the enclosure and to provide means for engagement by the cover catch. All elements of the cover and switch interlocks are part of the enclosure mounted handle operating mechanism. A simple sponge-like gasket provides a dust tight seal around the cover aperture, and the only unsealed openings are at the relatively small diameter bearings for the external operating handle and even these openings are shielded by portions of the operating handle.

Accordingly, a primary object of the instant invention is to provide a novel construction for a handle mechanism used to operate an enclosure mounted switch from outside the enclosure.

Another object is to provide a handle mechanism of this type which is relatively economical and compact.

A further object is to provide a handle mechanism of this type that is secured within an enclosure and requires that only a single aperture be cut in the enclosure cover.

Still another object is to provide a handle mechanism of this type in which the cover catch extends through the same aperture provided for the operating handle.

These objects as well as other objects of this invention shall become readily apparent after reading the following description of the accompanying drawings in which:

FIG. 1 is a perspective of an enclosure mounted switching device incorporating a handle mechanism constructed pursuant to the instant invention.

FIGS. 1A and 1B are fragmentary cross-sections of the enclosure cover taken through lines 1A—1A and 1B—1B, respectively, of FIG. 1 looking in the direction of the respective arrows 1A—1A and 1B—1B.

FIG. 1C is a fragmentary cross-section taken through line 1C—1C of FIG. 1 looking in the direction of arrows 1C—1C, and illustrating the hinge mounting of the enclosure cover.

FIG. 4 is a front elevation of the handle mechanism.

FIG. 5 is an elevation of the handle mechanism looking in the direction of arrows 5—5 of FIG. 4.

FIG. 6 is a partial side elevation of the handle mechanism looking in the direction of arrows 6—6 of FIG. 4 with the handle shown in the Off position.

FIG. 6A is a view similar to FIG. 6 showing the handle intermediate the On and Off positions.

FIG. 7 is a partial end view of the mechanism housing looking in the direction of arrows 7—7 of FIG. 6 to illustrate the cover locking means comprising a wire loop to receive the padlock.

FIG. 7A is an elevation showing the mounting of the cover locking means to the mechanism housing.

FIGS. 8A and 8B are elevations of the mechanism housing looking at opposite sides thereof.

FIGS. 9A and 9B are elevations of the mechanism housing looking in the directions of the respective arrows 9A—9A and 9B—9B.

FIG. 10 is an enlarged fragmentary portion of FIG. 8A showing the trip indicator and its cover mounted to the mechanism housing.

FIG. 10A is a cross-section taken through line 10A—10A of FIG. 10 looking in the direction of arrows 10A—10A.

FIG. 11 is a side elevation of the trip indicator member.

FIGS. 11A and 11B are elevations of the trip indicator member looking in the directions of the respective arrows 11A—11A and 11B—11B of FIG. 11.

FIG. 12 is an end view of the cover which encloses the indicator member.

FIGS. 12A and 12B are elevations of the indicator cover looking in the directions of the respective arrows 12A—12A and 12B—12B of FIG. 12.

FIG. 12C is a cross-section of the indicator cover taken through line 12C—12C of FIG. 12A looking in the direction of arrows 12C—12C, with the indicator member superimposed.

FIG. 13 is a fragmentary plan view of the enclosure cover in the region of the cover catch.

FIGS. 13A and 13B are cross-sections taken through lines 13A—13A and 13B—13B, respectively, of FIG. 13 looking in the direction of the respective arrows 13A—13A and 13B—13B.

Figure 2:
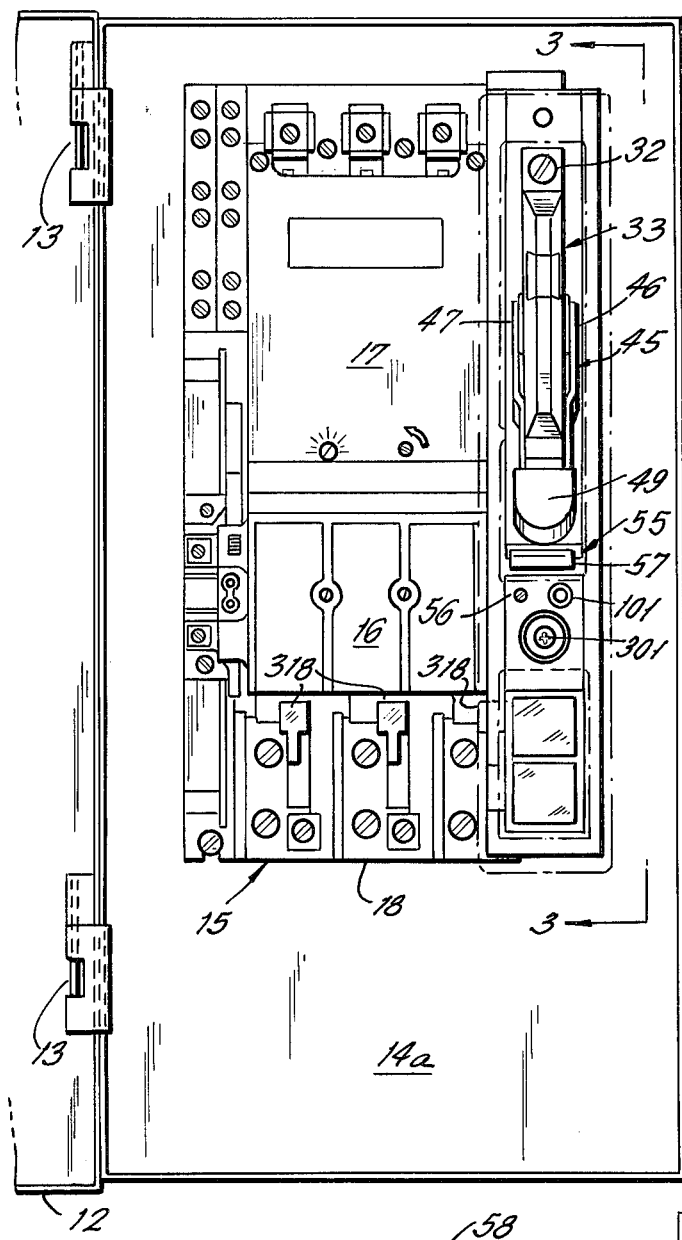
FIG. 2 is a front elevation of the switching device of FIG. 1 with the enclosure cover open.

Now referring to the Figures. Enclosed electric switching apparatus 10 of FIG. 1 includes generally rectangular enclosure 11 having an open front and provided with front cover 12 mounted on hinges 13 along cover edge 14. Disposed within enclosure 11 and secured to rear wall 14a thereof is combination motor starter 15, including electromagnetic contactor 16 connected in series with circuit breaker 17 as illustrated in the F. W. Kussy et al copending application Ser. No. 681,243 filed Apr. 28, 1976 for a Unitized Combination Starter. The end of contactor 16 remote from circuit breaker 17 is connected in series with an array of three overload relays 18 (FIG. 2).

Figure 3:
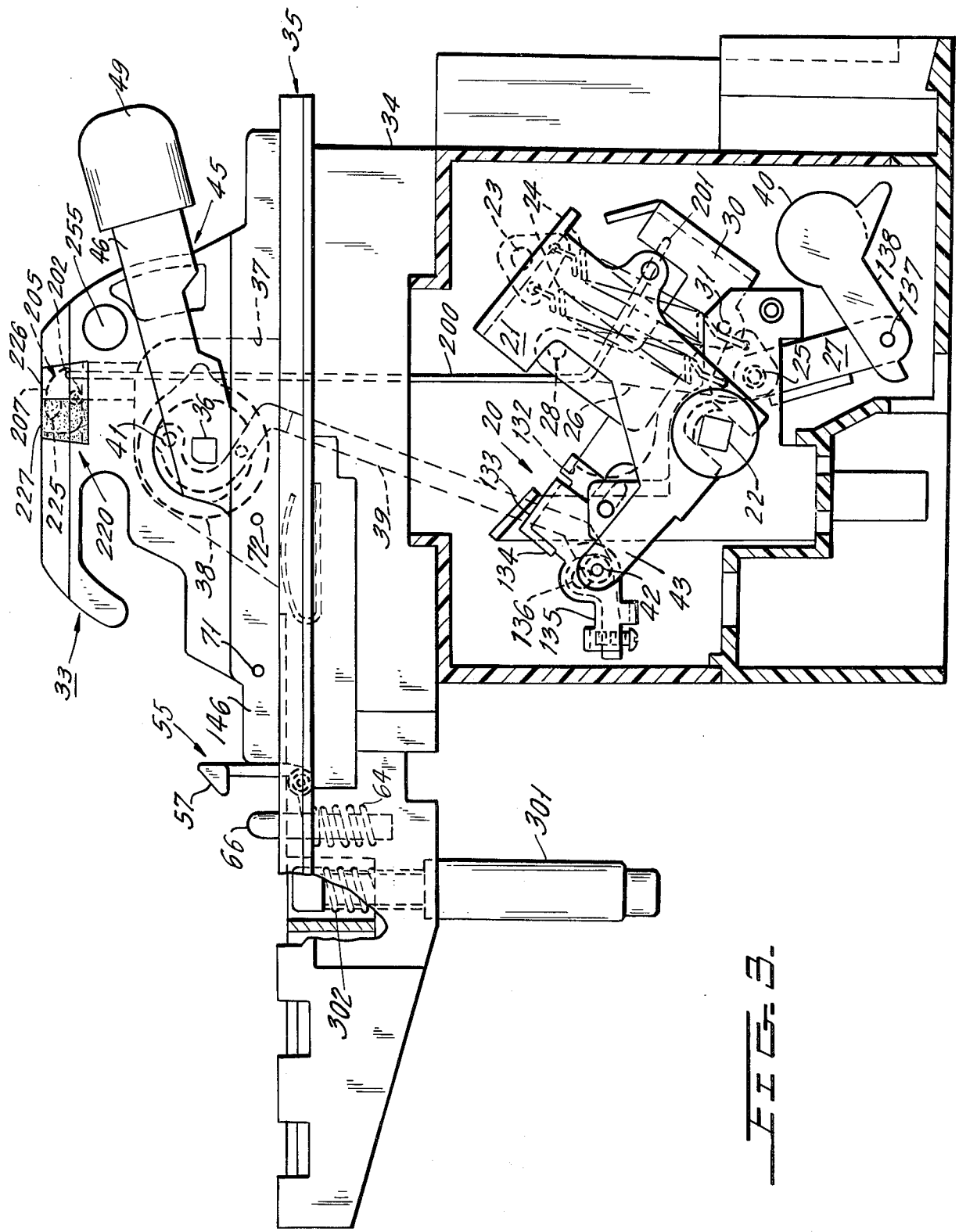
FIG. 3 is a side elevation of the handle mechanism and the contact operating mechanism looking in the direction of arrows 3—3 of FIG. 2 with the housing for the operating mechanism broken away to reveal the internal elements.

Circuit breaker 17 is provided with spring powered overcenter toggle contact operating mechanism 20 (FIG. 3) as described in the aforesaid copending application Ser. No. 681,243. Briefly, mechanism 20 includes operating member or actuator 21 mounted on fixed pivot 22 and carrying rod 23 to which the upper ends of main operating springs 24 are connected. The lower ends of springs 24 are connected to knee 25 which joins upper and lower toggle links 26, 27. Link 26, at the end thereof remote from knee 25, is pivotally connected by pin 28 to cradle 30 which is mounted on fixed pivot 31. In FIG. 3 cradle 30 is shown latched at point 132 to intermediate latch member 133. The latter is shown latched at point 134 to main latch 135 mounted on pivot 136. The lower end of toggle link 27 is pivotally connected to contact carrier 40 at the free end of its radial extension 138 by pivot pin 137. For a reason which will hereinafter be seen, it is noted that in FIG. 3 actuator 21 is shown in the closed contact position and is pivoted counterclockwise to open circuit breaker 17. It is also noted that when main latch 35 is released as a result of predetermined fault current conditions in circuit breaker 17, cradle 30 pivots clockwise with respect to FIG. 3.

Disposed forward of contact operating mechanism 20 is platform mechanism 35 including narrow molded insulating platform 34 and narrow hollow housing 33 secured to the forward surface of elongated platform 34 by screws 29 between parallel longitudinally extending rails 146, 147 on the front surface of platform 34. Platform mechanism 35 mounted to the rear wall 14a of enclosure 11 by having platform 34 secured directly to the housing for mechanism 20 by screws 32. For those applications where there is a greater space between mechanism 20 and cover 12, a separate standoff plate (not shown) is used to mount platform mechanism 35 to the rear wall of enclosure 11.

Pivot pin 36, having an out of round end, extends transversely through housing 33, and particularly extends through main cavity 37 thereof wherein crank disk 38 is disposed. While the latter may appear to be a single disk, it is in reality two disks spaced along the axis of pivot pin 36 and having the upper portion of drive link 39 disposed therebetween. Rivet 41 pivotally connects the upper end of link 39 to both sections of disk 38 at a position laterally offset from pivot 36. The lower end of link 39 is pivotally connected at point 42 to actuator extension 43 so that counterclockwise movement of pin 41 with respect to FIG. 3 drives connecting link 39 downward thereby pivoting actuator 21 counterclockwise to the contact open position. The non-rounded end of pivot pin 36 is received by a complementary aperture in arm 46 of U-shaped manual operating handle 45 whose web portion 48 (FIG. 5) is covered plastic cap 49 which moves past the front of housing 33 as handle 45 is operated between the On position of FIG. 3 and the Off position of FIG. 5. Near the free end of the other handle arm 47 an aperture thereof receives the rounded end of pivot pin 36 (FIG. 6). Handle 45 is constructed of stiff resilient material so that after spreading arms 46, 47 for mounting on pin 36, arms 46, 47 move inward to secure holding positions.

With cover 12 closed, housing 33 extends forward thereof through elongated aperture 51 (FIG. 1A) aligned with apertures in molded insulating escutcheon 52, metal backing plate 53 and gasket 54. Escutcheon 52 abuts the exterior of cover 12 and gasket 54 is interposed between the interior surface of cover 12 and plate 53. A plurality of screws 56, which extend through aperture 51 and engage threaded apertures (not shown) in plate 53, clamp cover 12 between escutcheon 52 and plate 53 in a predetermined adjusted position wherein the hook-like holding portion 57 of cover catch 55 in its holding position of FIG. 13A extends forward of cover 12 and engages a portion of escutcheon 52 to hold cover 12 closed.

Figure 14C:
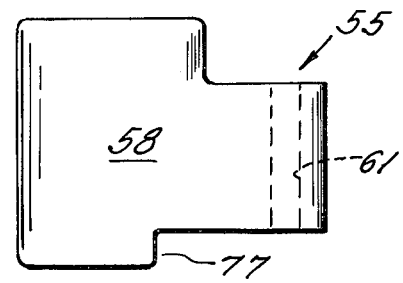
FIGS. 14A, 14B and 14C are additional elevations of the cover catch looking in the directions of the respective arrows 14A—14A, 14B—14B and 14C—14C of FIG. 14.
Figure 14B:
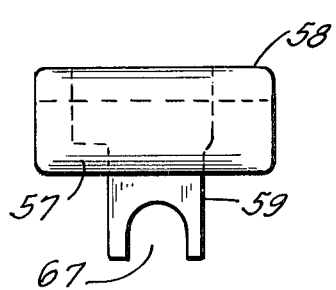
Figure 14:
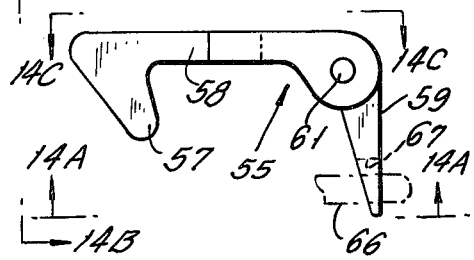
FIG. 14 is a side elevation of the cover catch.
Figure 14A:
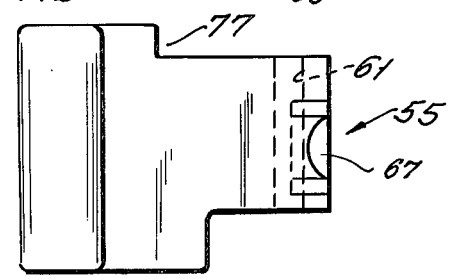

Catch 55 (FIG. 14) is an L-shaped member having forwardly extending leg 58 and leg 59 perpendicular thereto. Hook-like holding formation 57 is at the free end of leg 58, and at the juncture between legs 58 and 59 catch 55 is provided with transverse passage 61 through which pivot pin 62 (FIG. 13) for catch 55 extends. Torsion spring 63, wound around one end of pivot pin 62, biases catch 55 in a clockwise direction with respect to FIG. 13A to a holding position. With operating handle 45 in the Off position of FIG. 5, catch 55 may be operated manually to pivot clockwise with respect to FIG. 5 (counterclockwise with respect to FIG. 13A) to a cover releasing position by engaging hook-like portion 57 and moving it to the right with respect to FIG. 5. This will permit cover 12 to move toward its open position, being urged in this direction by coiled compression spring 64 (FIG. 13A) which bears against an interior surface of platform 34 and against retainer ring 65 on catch release or holding pin 66 to bias the latter forward, or to the right with respect to FIG. 13A, against a rear surface portion of cover mounted plate 53. Spring 64 is much stronger than spring 63 so that spring 64, acting through ring 65 in engagement with leg 59 of catch 55, biases the latter toward an inactive position where it is held until door 12 is closed to depress pin 66 by moving it rearward. Notch 67 in leg 59 provides clearance for the forward end of pin 66. Sponge-like gasket 81 (FIG. 5), cemented to the front surface of platform 34, lightly biases cover 12 toward open position. Gasket 81 also provides a dust tight seal around cover aperture 51 in that gasket 81 is partially compressed by cover carried plate 53 when cover 12 is closed.

As catch member 55 moves clockwise with respect to FIG. 5 to its inactive position, leg 58 engages cover interlock slide 70. With circuit breaker operating handle 48 in the open circuit position of FIG. 5, slide 70 is free to move to the right with respect to FIG. 5, being guided by housing protrusions or pins 71, 72 which extend through L-shaped slot 73 and straight slot 74, respectively, of cover interlock 70, into notches in rail 146. When handle 45 is pivoted clockwise with respect to FIG. 5 to its closed position, the free end of handle arm 46 blocks movement of cover interlock 70 to the right, thereby normally blocking movement of cover catch 55 to its inactive position. Under these circumstances, interlock 70 may be defeated by using a screwdriver or other tool to apply a rearward force, at region 75 adjacent nose 76, acting against U-shaped biasing spring 79. The latter is a generally U-shaped wire disposed within a cavity of platform 34 and biased interlock member 70 forward. Depressing nose 76 of interlock member 70 brings nose 76 in line with clearance notch 77 in arm 58 so that catch 55 is free to pivot to its inactive position where it is held by biasing spring 64. Nose 76 may be depressed (moved rearward) in that member 70 pivots about pin 72 and the forwardly extending leg of L-shaped slot 73 moves relative to pin 71.

With cover 12 open, switch interlock member 82 is in its blocking position of FIG. 6, being urged thereto by U-shaped wire spring 83 disposed within a cavity of platform 34 in position urging the nosed end 85 of interlock member 82 forward about pivot 84 extending sideways from housing 33 into a notch in rail 147. In this blocking position, nose 85 is disposed within cutout 86 at one end of the arcuate portion 87 at the free end of operating handle arm 47. With interlock member 82 in its active position of FIG. 6, nose 85 blocks counterclockwise pivoting of circuit breaker operating handle 45. Tab 88, extending transversely from member 82 into another notch in rail 147, may be manually depressed (moved rearward) to move switch interlock member 82 to its inactive position of FIG. 6A. Tab 88 may also be depressed by closing cover 12 so that a portion of cover mounted plate 53 engages and thereby depresses tab 88. This action pivots interlock member 82 counterclockwise about its pivot 84 thereby moving nose portion 86 rearward to a non-blocking position to permit handle 45 to pivot counterclockwise with respect to FIG. 6.

Both interlock members 70 and 82 are stamped sheet metal elements mounted for movement in planes generally parallel to the longitudinal axis of platform 34 and perpendicular to cover 12 when the latter is closed. Member 70 is disposed between and guided by rail 146 and one side of housing 33 while member 82 is disposed between and guided by rail 147 and the other side of housing 33. This arrangement contributes to overall compactness of handle mechanism 35.

Mechanism 35 is also provided with means in the form of generally rectangular wire loop 90 (FIGS. 6 and 7), padlocking cover 12 closed. Loop 90 is split to form a gap through which shoulder screw 91 extends to be threadably received by aperture 141 (FIG. 8B) in the side of housing 33 adjacent handle arm 47. The portions of loop 90 having the gap for screw 91 are positioned in housing recesses 142, 143 and the portions of member 90 immediately adjacent the gap are flattened and abut flat washer 93. The latter is disposed in housing recess 144 and abuts spring washer 92 interposed between housing 33 and flat washer 93. The flattened portions of loop member 90 are so oriented that member 90 is biased toward the inactive position shown in solid lines in FIGS. 7 and 7A wherein member 90 is generally at right angles to closed cover 12. However, loop member 90 is movable to an active position shown in phantom in FIG. 7A by pivoting member 90 clockwise with respect to FIG. 7. In its active position, member 90 is positioned so as to interfere with opening of door 12, the latter being pivoted at the right with respect to FIG. 7. In this active position, member 90 is intended to receive one or more padlocks which prevent member 90 from returning to its active position whereby cover 12 is blocked from opening. It is noted that with loop 90 in the inactive position of FIG. 7, the forward portion thereof is offset away from the side of housing 33 thereby providing clearance for operation of handle 45.

Cover 12 may also be held closed by a tool operated fastener consisting of cooperating male and female parts 101, 102, respectively (FIGS. 1A and 13B). The latter is force fitted to platform 34 and is provided with a front opened recess accessible through wide-mouthed opening 103 in the front surface of platform 34. Male part 102 extends through clearance aperture 104 in escutcheon 52 and is engaged by retaining clip 105 at the rear of escutcheon 52. Screwdriver engageable slotted head portion 106 of member 101 is disposed within hollow forward embossment 107 of escutcheon 52. Elements 101, 102 constitute a so-called quarter turn fastener well known to the mechanical arts. It should now be apparent that locking parts 101, 102 may be replaced by a cover mounted screw (not shown) and a threaded insert (not shown) mounted to platform 34.

Now referring more particularly to FIGS. 3, 10, 11 and 12. Formed wire link 200 is connected at its lower end 201 to cradle 30 of contact operating mechanism 20. Upper end 202 of link 200 is connected to trip indicator member 205 of FIG. 11 by extending through aperture 206 in sector-shaped vane 207. Aligned pivot formations 208, 208 extend perpendicular to vane 207 from opposite sides thereof and are disposed within pivot depressions 209, 209 at the floor of front cutout 210 in housing 33. Link 200 enters recess 210 by extending through passage 211 between main cavity 37 and recess 210. Plastic cover member 220 is of generally U-shaped cross-section having interior formations 221, 221 along both arms thereof which align with bearing depressions 209, 209 when cover 220 encloses recess 210. At this time inward protrusions 222, 222 at the free ends of the arms of cover 220 engage and lock in holding slots 223 of housing 33 so that formations 221, 221 confront bearing pins 208, 208 of member 205 to retain the latter seated on bearing formations 209, 209.

As previously noted when, latch 35 of operating mechanism 20 is released, cradle 30 pivots clockwise with respect to FIG. 3. This motion of cradle 30 pulls link 200 downward thereby pivoting indicator member 205 clockwise with respect to FIG. 12C to the trip position indicated in phantom. In this position indicating portion 225 of member 205, disposed at the end of vane 207 remote from link 200, is positioned in alignment with transparent portion 226 of cover 220, whereas normally indicating portion 225 is behind opaque portion 227 of cover 220. It should now be apparent to those skilled in the art that when cradle 30 is in the latched position of FIG. 3, link 200 is in its raised position so that only transparent or non-contrasting portions of member 305, principally the edge portion 229 of vane 207, are visible through transparent portion 226 of cover 220. Indicator portion 225 is of a color that contrast sharply with the floor portion of recess 210 so that portion 225 will be highly visisble through transparent portion 226 to indicate that operating mechanism 20 has tripped rather than having been opened manually.

Platform 34 also mounts member 301 (FIG. 3) which is biased in a forward direction by coiled compression spring 302 and is depressible in a rearward direction so as to engage a member (not shown) for resetting the array of overload relays 18 by engaging reset handles 318 thereof. In addition, platform 34 has provisions for mounting On Off controls 302, 303 at platform cavity 304 (FIG. 4). It should also be apparent to those skilled in the art that handle 45 may be padlocked in the open position by utilizing housing slot 250 which is open at its right end when viewed in FIG. 6. For purposes of locking handle 45 in the closed circuit position, when such feature is desired, a lock receiving opening may be drilled through housing 33 at circular depression 255 (FIG. 3).

Although a preferred embodiment of this invention has been described, many variations and modifications will now be apparent to those skilled in the art, and it is therefore preferred that the instant invention be limited not by the specific disclosure herein but only by the appending claims.

What is claimed is:

1. Enclosed switch apparatus including an enclosure having a front opening, a cover hingedly connected along a first of its edges to said enclosure for closing said opening, switch means inside said enclosure including a contact operating mechanism, switch operating means mounted to said enclosure forward of said contact operating mechanism, said operating means including platform means comprising a hollow narrow housing, a U-shaped manual operating handle having arms positioned adjacent opposite sides of said housing and having an end portion thereof keyed to pivot means extending transversely of said housing, linkage means keyed to said pivot means extending transversely of said housing, linkage means keyed to said pivot means and connected to said operating mechanism for operation of the latter by operation of said handle, said cover including means defining aperture means through which said housing extends when said cover is closed, said aperture means disposed adjacent a second edge of said cover opposite said first edge thereof, cover catch means on said platform means, defeatable cover interlock means on said platform means to prevent operation of said catch means to release said cover when said handle is in switch closed position, and defeatable switch interlock means on said platform means to prevent operation of said handle to switch closed position when said cover is open, said catch means having a cover holding portion extending through said aperture means forward of said cover when the latter is closed.

2. Switch apparatus as set forth in claim 1 in which the pivot means defines an axis for the operating handle, said pivot means disposed in a plane which is generally parallel to said cover when the latter is closed, said axis extending generally perpendicular to a plane containing an additional axis defined by additional pivot means hingedly connecting the cover to the enclosure.

3. Switch apparatus as set forth in claim 2 in which the catch means is pivoted on an axis parallel to the axis for said operating handle.

4. Switch apparatus as set forth in claim 1 in which the platform means includes an elongaged platform aligned with the aperture means and disposed behind the cover when the latter is closed, said housing secured to the front of said platform.

5. Switch apparatus as set forth in claim 4 in which there is additional means on said platform for operation of control switch means inside said enclosure, said additional means being accessible for operation from outside said enclosure.

6. Switch apparatus as set forth in claim 4 also including a sponge-like gasket secured to the front of said platform to provide a seal around said aperture means when said cover is closed.

7. Switch apparatus as set forth in claim 4 in which the pivot means defines an axis for the operating handle, said pivot means disposed in a plane which is generally parallel to said cover when the latter is closed, said axis extending generally perpendicular to a plane containing an additional axis defined by additional pivot means hingedly connecting the cover to the enclosure.

8. Switch apparatus as set forth in claim 7 in which the catch means is pivoted on an axis parallel to the axis for said operating handle.

9. Switch apparatus as set forth in claim 8 also including a sponge-like gasket secured to the front of said platform to provide a seal around said aperture means when said cover is closed.

10. Switch apparatus as set forth in claim 9 in which there is additional means on said platform for operation of control switch means inside said enclosure.

* * * * *